Figure 1:
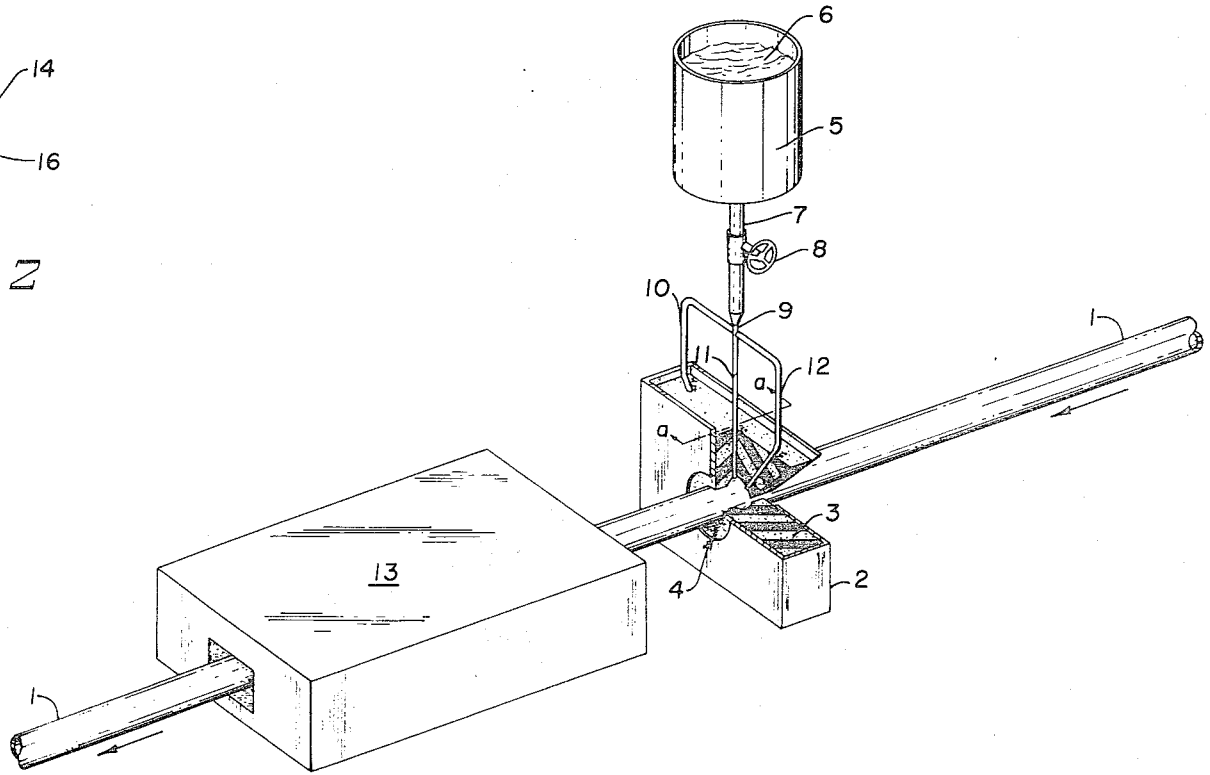
Figure 2:
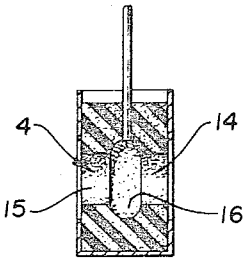

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1212

T892,016

PREPARATION OF PLASTIC CONTAINERS HAVING A HIGH DEGREE OF RESISTANCE TO VAPOR TRANSMISSION

Edward R. Hollander, Jr., P.O. Box 511, Kingsport, Tenn. 37662

Filed Feb. 8, 1971, Ser. No. 113,405
Int. Cl. B44d *11/02, 11/09*
U.S. Cl. 117—94
1 Sheet Drawing. 10 Pages Specification

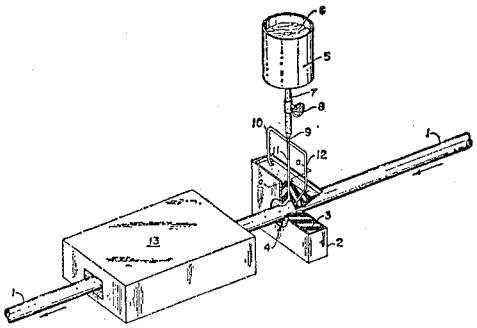

A high degree of resistance to the transmission of moisture vapor through the walls of a tubular or other form of plastic container is attained by the in-line coating of the outer surface of such containers with polyvinylidene chloride applied in the form of an aqueous emulsion. Coating with the emulsion is attained by (a) passing the plastic container through and in wiping contact with a resilient porous medium, such as a sponge saturated with the emulsion, thereby leaving a coating of the emulsion on the container; and (b) evaporating off the water content of the deposited emulsion by heating the emulsion-coated container in a current of air to leave a very thin, highly moisture-resistant polyvinylidene chloride coating adhered to the outer surface of the container.

Nov. 23, 1971 E. R. HOLLANDER, JR T892,016

PREPARATION OF PLASTIC CONTAINERS HAVING A HIGH DEGREE OF RESISTANCE TO VAPOR TRANSMISSION

Filed Feb. 8, 1971

EDWARD R. HOLLANDER, JR.
INVENTOR.

BY Earl D. Gustafson
George P. Chandler
ATTORNEY